United States Patent
Loeper et al.

(10) Patent No.: US 6,929,281 B2
(45) Date of Patent: Aug. 16, 2005

(54) AIRBAG DEVICE AND METHOD FOR OPENING AN AIRBAG FLAP

(75) Inventors: Dieter Loeper, Karlsruhe (DE); Michael Fischer, Hagenbach (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 0 days.

(21) Appl. No.: 10/785,929

(22) Filed: Feb. 23, 2004

(65) Prior Publication Data

US 2004/0232662 A1 Nov. 25, 2004

Related U.S. Application Data

(63) Continuation of application No. PCT/EP02/09338, filed on Aug. 21, 2002.

(51) Int. Cl.⁷ .............................................. B60R 21/20
(52) U.S. Cl. ................................. 280/728.3; 280/732
(58) Field of Search ..................... 280/728.3, 728.2, 280/732

(56) References Cited

U.S. PATENT DOCUMENTS

| | | | |
|---|---|---|---|
| 5,466,000 A | * 11/1995 | Leonard et al. | 280/728.3 |
| 5,842,717 A | * 12/1998 | Wohllebe et al. | 280/734 |
| 6,042,139 A | * 3/2000 | Knox | 280/728.3 |
| 6,161,864 A | * 12/2000 | Heilig | 280/728.2 |
| 6,315,321 B1 | * 11/2001 | Lutz | 280/728.3 |
| 6,364,345 B1 | * 4/2002 | Lang | 280/728.3 |
| 6,523,854 B1 | * 2/2003 | Muller | 280/728.3 |

FOREIGN PATENT DOCUMENTS

| | | |
|---|---|---|
| DE | 38 43 686 A1 | 12/1988 |
| DE | 40 22881 A1 | 2/1991 |
| DE | 197 24 594 A | 1/1998 |
| DE | 196 46 543 A1 | 5/1998 |
| DE | 198 55 909 A1 | 6/1999 |
| DE | 199 34 600 A1 | 1/2000 |
| DE | 100 01 040 C1 | 1/2001 |
| EP | 0867 346 A1 | 9/1998 |
| EP | 0940 300 A1 | 9/1999 |

* cited by examiner

Primary Examiner—David R. Dunn
(74) Attorney, Agent, or Firm—Martin Fleit; Paul D. Bianco; Fleit Kain Gibbons Gutman Bongini & Bianco P. L.

(57) ABSTRACT

An airbag device having at least one airbag flap having a first area which is used to cover an outlet for the airbag characterized in that the airbag flap is also provided with a second area upon which an airbag enfolding after release exerts a pressure, whereby the airbag flap performs a substantially rotary movement in order to free said outlet.

14 Claims, 4 Drawing Sheets

AIRBAG DEVICE AND METHOD FOR OPENING AN AIRBAG FLAP

RELATED APPLICATION

This application is a continuation of International Application PCT/EP02/09338, filed Aug. 21, 2002, the contents of which are here incorporated by reference in their entirety. The benefits of 35 USC 120 are claimed.

BACKGROUND OF THE INVENTION

1. Field of the Invention

The invention concerns an airbag device and a method for opening an airbag flap, in particular, for use in a motor vehicle.

2. Prior Art

Various airbag arrangements are known from the state of the art:

From DE 196 46 543, an interior trim part for motor vehicles with airbag equipment is known. In the release of the airbag, the cover area of the guide channel is torn along its center line. The torn area opens in the form of a "pointed oval," similar to the form of an open fish mouth.

From documents DE 100 01 040 C1, DE 38 43 686 A1, DE 40 22 881 C2, and EP 0 940 300 A1, various other airbag covers are known that are flung inwards into the passenger space when the airbag is released, wherein the movement of the cover is limited by a restraining belt. One common disadvantage here is that there is an injury risk when the cover enters the passenger space.

From EP 0 867 346 A1, an airbag device and a corresponding method to release the airbag device are known, in which a cover of the exit opening of the airbag is essentially moved within an outside contour of the airbag device, or of a motor vehicle part containing the airbag device, when the airbag is released. This type of movement requires, however, an expensive guide bar bracket for the movement of the cover device within the outer contour.

SUMMARY OF THE INVENTION

The problem on which the invention is based, therefore, is to create an improved airbag device and an improved method to open an airbag flap.

The problem on which the invention is based is solved with the features of the independent patent claims. Preferred embodiments of the invention are indicated in the dependent patent claims.

A special advantage of the invention is to be found in that the movement of the airbag flap for freeing the exit opening of the airbag after it is triggered proceeds, in a defined manner, essentially outside the passenger area of the motor vehicle. Thus there is an increased safety in comparison to the state of the art, since the opening airbag flap does not represent an injury risk for persons in the interior of the motor vehicle, in particular even if a front-seat passenger is in a so-called Out-Off Position, for example. The fact that the opening movement of the airbag flap can essentially take place outside the passenger space means that the danger of head injuries caused by the opening airbag flap is minimized, especially also in the Out-Off Position.

Another special advantage of the invention is that the defined opening movement of the airbag flap can be obtained without a guide bar bracket or the like, but rather with a rotary movement, for example, around an axis opposite the exit opening.

According to a preferred embodiment of the invention, two airbag flaps are provided that when closed form a space, tapering toward the exit opening, into which the airbag unfold inwards. With an unfolding of the airbag into this space, a pressure is exerted on both airbag flaps so that these rotary movements are effected in opposite turning directions. In this way, the airbag flaps are displaced, at least partially, under an instrument panel, so that the airbag opening is freed.

According to another preferred embodiment of the invention, an ornamental cover is located on the airbag flap. A gap is provided between a boundary of the instrument panel and a boundary of the airbag flap, through which the ornamental cover extends, in a curved shape, onto the underside of the instrument panel. As a result of the curved shape of the ornamental cover in its end area, its movement under the instrument panel during the opening operation is assisted.

According to another preferred embodiment of the invention, the end area of the ornamental cover is fixed in a detachable manner on the inside of the instrument panel. This ensures that the ornamental cover retains the same visual appearance in the exit opening even with a subsiding clamping effect, for example, as a result of aging of the material. After triggering of the airbag, this connection is disengaged, for example, broken up.

According to another preferred embodiment of the invention, there is a gap between the two airbag flaps when closed. Above this gap, the ornamental cover has a breaking point. After the airbag is triggered, the corresponding pressure therefore acts directly on the breaking point, so that it can tear in a particularly easy way. The breaking point can be produced, for example, by weakening the material of the ornamental cover, especially by means of a laser beam.

According to another preferred embodiment of the invention, the opposed rotary movements of the two airbag flaps are laterally limited by the airbag housing. After the airbag is triggered, a stop is formed by the airbag flaps on the airbag housing. In this way, a defined end position of the open airbag flaps exists outside the passenger space.

BRIEF DESCRIPTION OF THE DRAWINGS

Below, preferred embodiments of the invention are explained in more detail, with reference to the drawings. The figures show the following.

DETAILED DESCRIPTION OF PREFERRED EMBODIMENTS OF THE INVENTION

Figure 1:
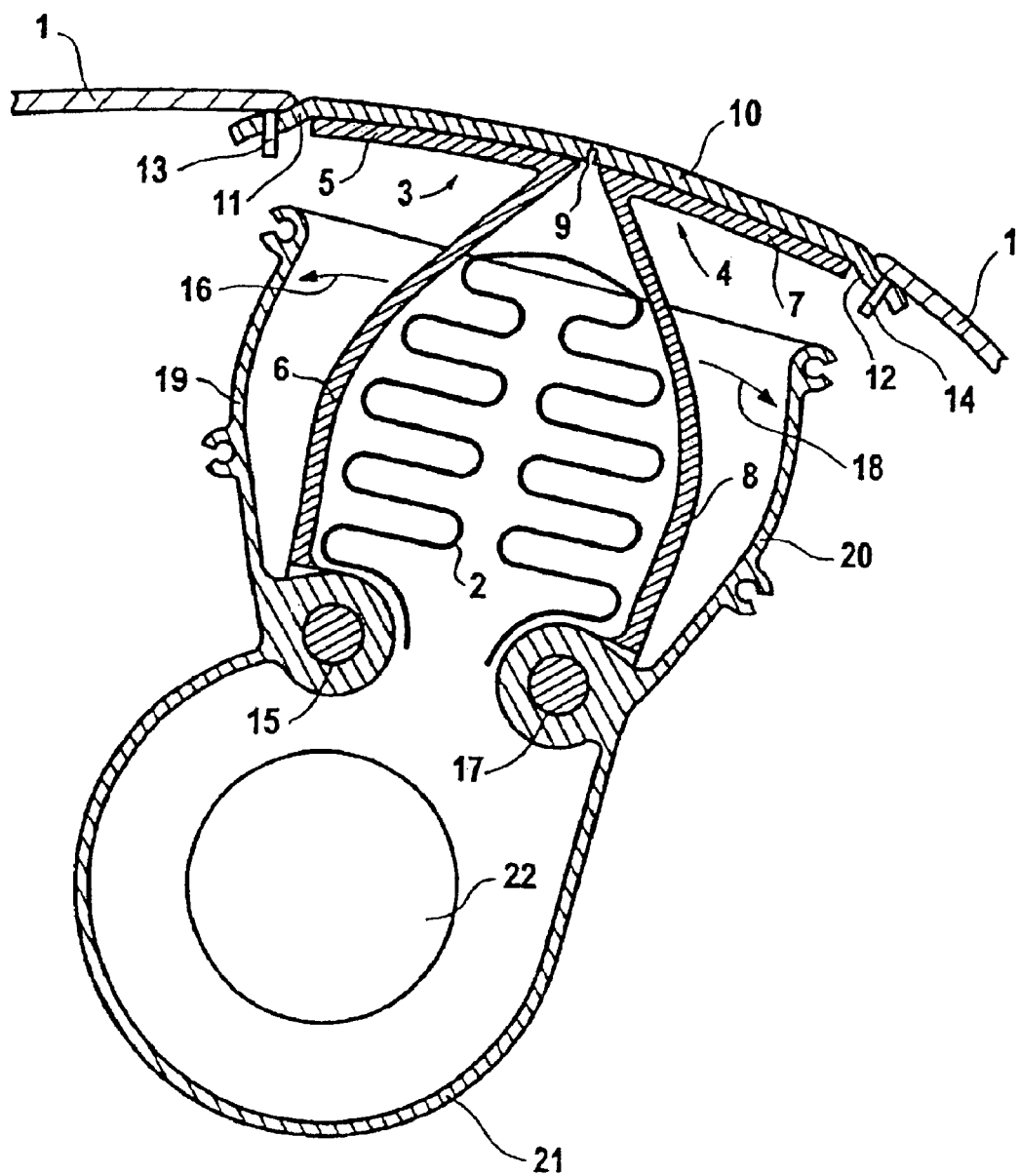
FIG. 1, a first embodiment of an airbag device according to the invention, when closed.

FIG. 1 shows an instrument panel 1 of a motor vehicle, in particular, a private automobile. The instrument panel 1 has an exit opening for an airbag 2. The exit opening for the airbag 2 can also be provided in another part of the interior trim of the motor vehicle.

The airbag 2 is located in a space delimited by, among other things, the airbag flaps 3 and 4. The space delimited by the airbag flaps 3 and 4 tapers in the direction of the exit opening and is, for example, shaped essentially in the form of a funnel.

The airbag flap 3 has an area 5 for covering one side of the exit opening. Furthermore, the airbag flap 3 has an area 6 that forms a boundary of the space tapering in the direction of the exit opening. Correspondingly, the airbag flap 4 has an area 7 covering the other side of the exit opening and an area 8 that delimits the tapering space on the other side.

The areas 6 and 8 of the airbag flaps 3 and 4 run toward one another in the direction of the exit opening, but without touching. Between the areas 6 and 8, therefore, a gap also remains directly on the exit opening. Above this gap, there is a breaking point 9 of an ornamental cover 10. The breaking point 9 is, for example, produced by means of a laser weakening of the ornamental cover 10.

The ornamental cover 10 extends over the entire range of the exit opening and is firmly connected with the areas 5 and 7 of the airbag flaps 3 and 4.

The ornamental cover 10 has end areas 11 and 12. The end area 11 is conducted through a gap, found between the edge of the instrument panel 1 and the edge of the area 5, on the back side of the instrument panel 1. In this way, the end area 11 obtains a curved shape. On the underside of the instrument panel 1, the end area 11 is fixed, in a detachable manner, with a fastening element 13 on the underside of the instrument panel 1. The fastening element 13 may be, for example, a clip connection or a plastic bolt.

Correspondingly, the end area 12 is conducted through the gap formed between the edge of the area 7 and the edge of the instrument panel 1 to the back side of the instrument panel 1, and is fixed with a fastening element 14 on the back side of the instrument panel 1.

The airbag flap 3 is located on a joint 15 that enables a pivoting movement of the airbag flap 3 in the direction of the arrow 16 when the airbag is released. The joint 15 is located opposite the exit opening of the airbag.

Correspondingly, the airbag flap 4 is located on a joint 17 that permits a pivoting movement in the direction of the arrow 18 upon release. The joint 17 is also located opposite the exit opening of the airbag.

The airbag device of FIG. 1 also has a housing with two lateral housing parts 19 and 20. The rotary movement of the airbag flap 3 in the direction of the arrow 16 is limited by a stop formed by the housing part 19 upon release, just as the corresponding movement of the airbag flap 4 is limited by a stop formed by the housing part 20. The corresponding stops are thereby formed by the area 6 and area 8, respectively, of the airbag flaps 3 or 4.

A gas generator 22 for deployment of the airbag 2 upon release is located in a lower area 21 of the airbag device.

Figure 2:
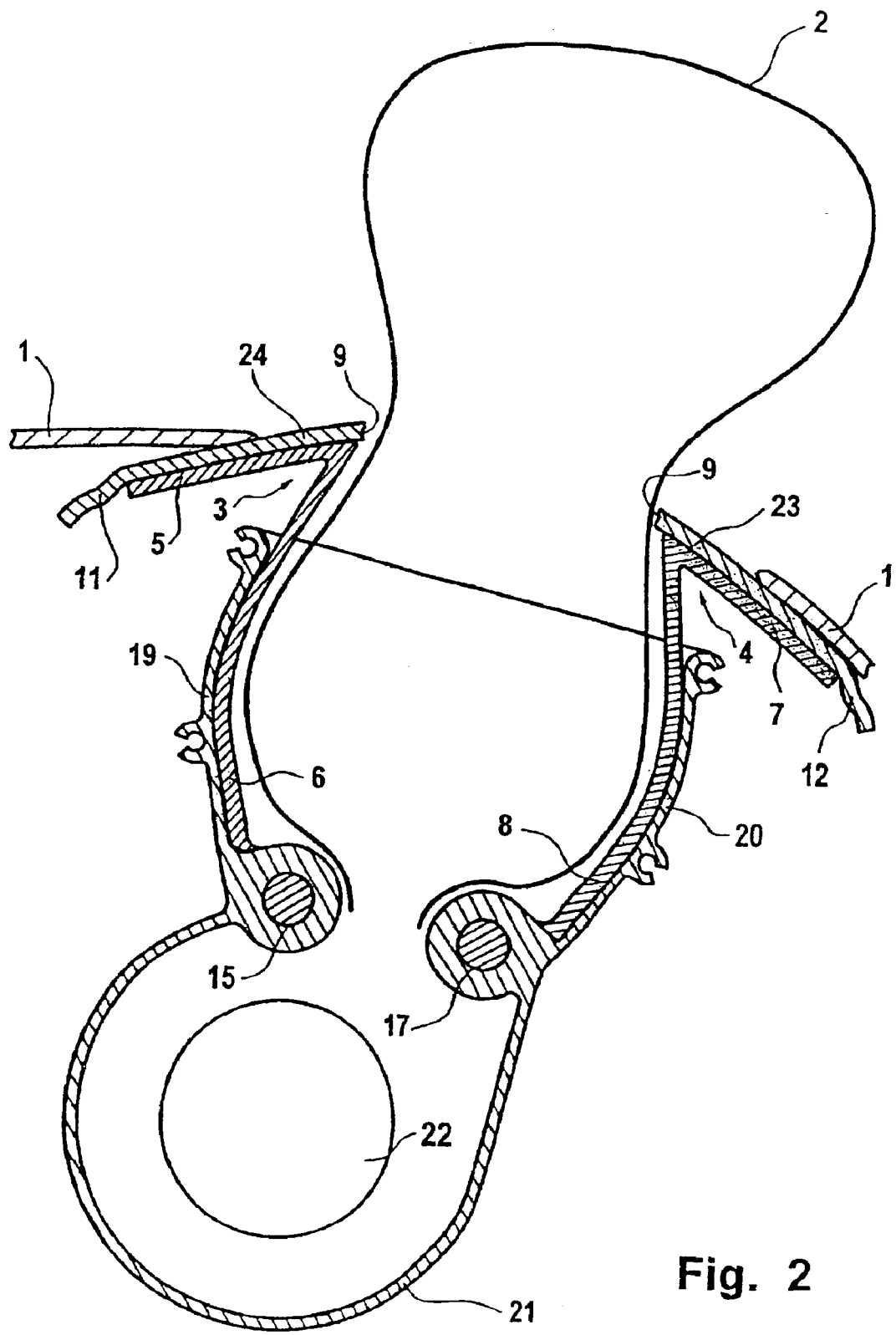
FIG. 2, the airbag device of FIG. 1, after release of the airbag.

FIG. 2 shows the airbag device of FIG. 1 after release of the airbag. Elements of FIG. 2 that correspond to elements of FIG. 1 are designated with the same reference symbols.

In the representation of FIG. 2, airbag 2 has been released because the gas generator 22 suddenly produced a gas for the expansion of the airbag 2. By the inflowing of gas into the airbag 2, a pressure is produced, in the airbag in the areas 6 and 8 of the airbag flaps 3 and 4 (see FIG. 1). A pressure was likewise produced in this way at the breaking point 9.

In this way, the breaking point 9 of the ornamental cover 10 (see FIG. 1) was broken so that the ornamental cover 10 was subdivided into the two areas 23 and 24. By the expansion pressure of the airbag 2, the airbag flaps 3 and 4 effect a pivoting movement in the direction of the arrow 16 or 18 (see FIG. 1), and then form stops with their areas 6 and 8 against the housing parts 19 and 20 in the end position shown in FIG. 2.

The areas 5 and 7 of the airbag flaps 3 and 4 have moved under the respective edges of the instrument panel 1, together with the areas 24 and 23 of the ornamental cover, with this opening movement, in the process of which the fastening elements 13 and 14 (see FIG. 1) were detached—that is, were broken, for example. The moving under was assisted by the curved shape of the end areas 11 and 12 of the ornamental cover 10. In addition, along with the movement under the instrument panel 1 there may be an elastic deformation of the instrument panel 1 as a result of the squeezing effect of the airbag flaps 3 and 4 moving under the instrument panel 1.

It is particularly advantageous in this connection that the opening movement of the airbag flaps 3 and 4 proceed essentially outside the passenger space. In this way, the injury risk to the automobile passengers is diminished. In addition, it is particularly advantageous that this movement be implemented without an expensive guide bar bracket or the like, essentially only by means of a pivoting movement around the joints 15 and 17.

In the embodiment shown, however, the airbag flaps 3 and 4 initially penetrate the interior space of the motor vehicle by a small amount with the opening movement after triggering of the airbag, and are then almost completely withdrawn again from the interior space of the automobile as they move under the instrument panel. The reason for this has to do with the curvature radii of the envelope of the instrument panel and the opening movement. This slight penetration into the passenger space is not an impairment to the safety of the passengers of the motor vehicle, however. Accordingly, embodiments with only one airbag flap, and/or another part of the interior trim of the motor vehicle instead of the instrument panel, can be implemented.

The invention has the additional advantage that, for example, a jamming of the opening airbag flap in a guide bar bracket can be avoided. The process of deploying the airbag therefore, is effected according to a precisely pre-specified movement course and at the same time is implemented by means of a second pivoting movement. It is also particularly advantageous that the pivoting movement requires only a relatively small fraction of the pressure delivered by the gas generator 22, so that the expansion of the airbag 2 is not substantially slowed down or a particularly large gas generator 22 would be required.

Figure 3:
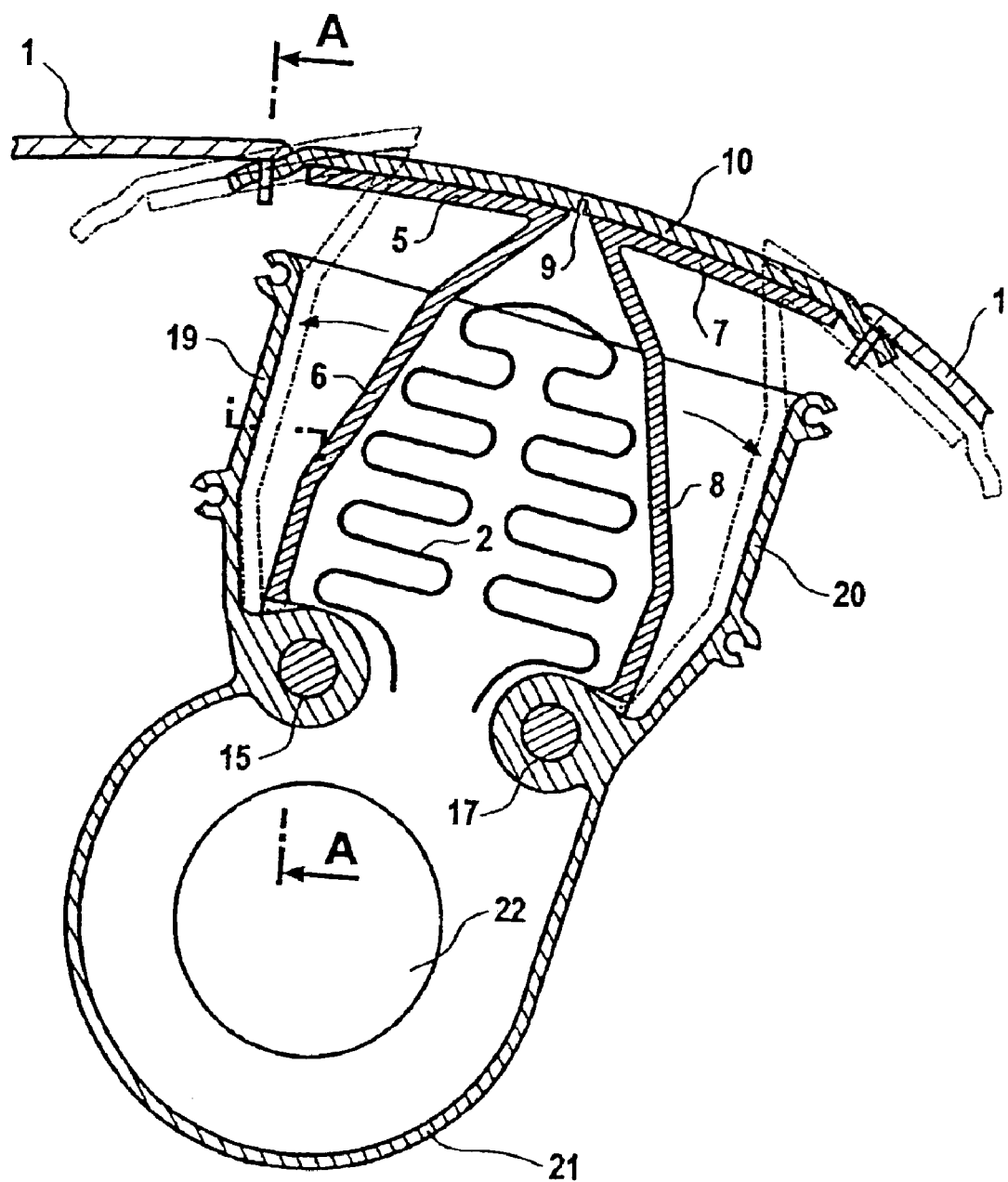
FIG. 3, a second embodiment of an airbag device, according to the invention, when closed and after the airbag is released.

FIG. 3 shows a second embodiment of an airbag device, according the invention. In the embodiment of FIG. 3, elements which correspond to FIGS. 1 and 2 are again designated with the same reference symbols.

The embodiment of FIG. 3 essentially differs from the embodiment of FIGS. 1 and 2 in that the areas 6 and 8 of the airbag flaps are formed to run straight in sections. Even with this embodiment, however, the space circumscribed by areas 6 and 8 tapers in the direction of the exit opening of the airbag 2.

The opened position is shown with a broken line in FIG. 3.

Figure 4:
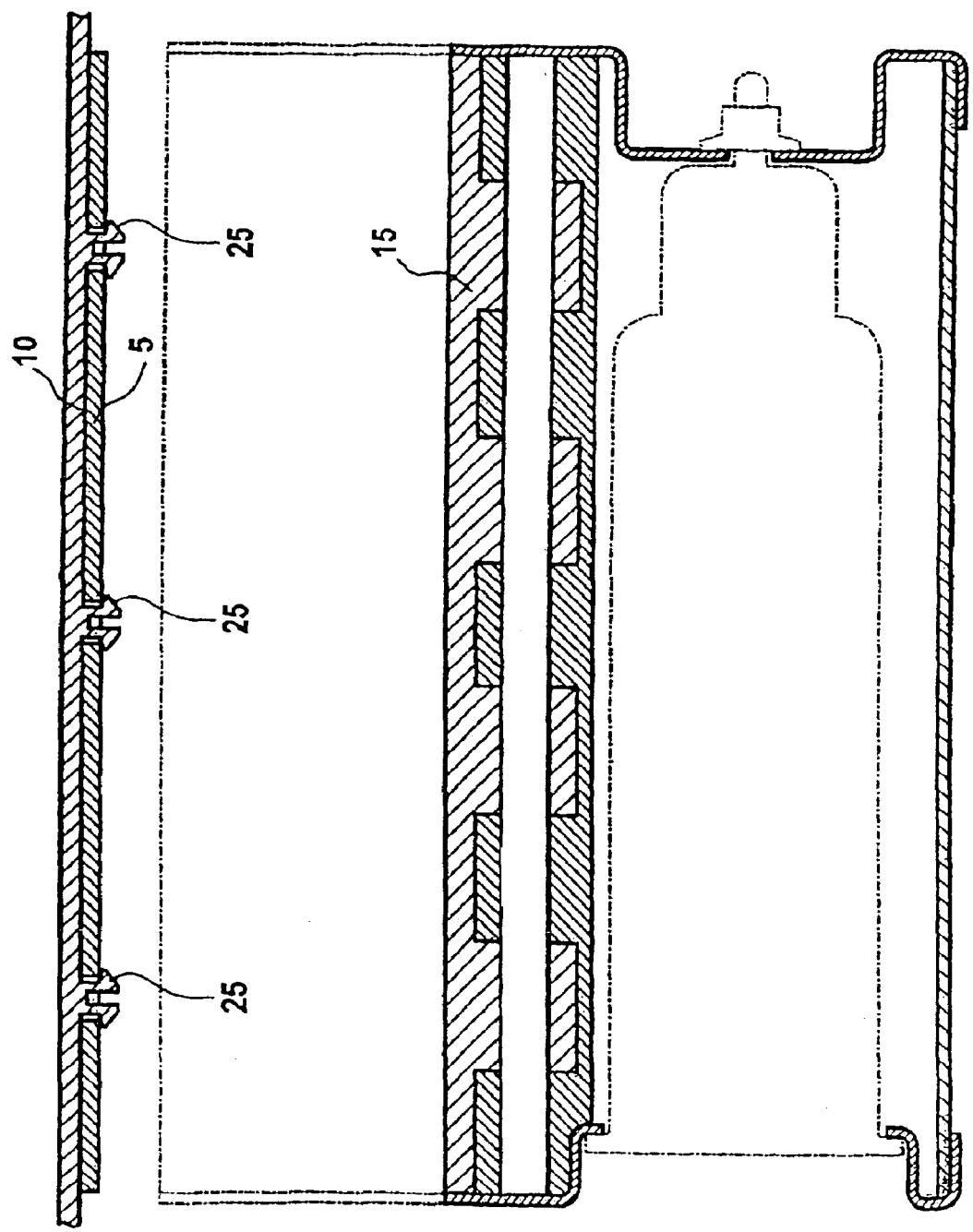
FIG. 4, section A—A of FIG. 3.

FIG. 4 shows the section A—A of FIG. 3. As can be seen in this depiction, the joint 15 is designed as a hinge. The ornamental cover 10 is connected in a form-locking manner with the area 5 of the airbag flap 3 (by means of fastening element 25).

Reference Symbol List (1) Instrument panel
(2) Airbag (3) Airbag flap
(4) Airbag flap
(5) Area
(6) Area
(7) Area
(8) Area
(9) Breaking point
(10) Ornamental cover
(11) End area
(12) End area
(13) Fastening element
(14) Fastening element
(15) Joint
(16) Direction of arrow
(17) Joint
(18) Direction of arrow
(19) Housing part
(20) Housing part
(21) Lower area
(22) Gas generator
(23) Area
(24) Area
(25) Fastening elements

What is claimed is:

1. An airbag assembly for a vehicle having an interior panel defining an exit opening for an airbag, said airbag assembly to be mounted behind the exit opening away from the vehicle interior, said airbag assembly comprising a housing having a first region adjacent the exit opening and extending away from the exit opening and a second region remote from the exit opening, an airbag mounted in the first region, a gas generator mounted in the second region, a pair of airbag flaps each having a first portion and a second portion, said first portions of said airbag flaps, when mounted in said vehicle lying adjacent to and extending across the exit opening, said second portions of said airbag flaps together forming a tapered inward shape, said second portions being pivotally mounted on opposite sides of the airbag such that during inflation the airbag will contact the second portions end pivot the second portions outwardly away from each other while moving the first portions away from each other and partially beneath the vehicle panel to free the exit opening and allow the inflating airbag passage into the vehicle interior.

2. An airbag assembly according to claim 1 wherein an ornamental cover having a weakened line is attached to the first portions of the airbag flaps on opposite of the weakened line, and wherein the edge of the ornamental cover is inserted under the vehicle panel about the perimeter of the exit opening.

3. An airbag assembly according to claim 2 wherein a gap is formed between the first portions of the airbag flaps and the edge of the exit opening and the edge of the ornamental cover passes through said gap.

4. An airbag assembly according to claim 3 wherein the edge area of the ornamental cover has a curve-shaped profile in order to facilitate moving the first portions and the ornamental cover, under the edge of the exit opening of the panel.

5. An airbag assembly according to claim 1 wherein the second portions of the airbag flaps are at least partially curved.

6. An airbag assembly according to claim 1 wherein the second portions of the airbag flaps are straight sections.

7. An airbag assembly according to claim 1 wherein the housing defines stops to limit the pivotal outward movement of the second portions of the airbag flaps.

8. An airbag assembly according to claim 2 wherein a gap is formed between the first portions, said gap juxtaposed to the weakened line of the ornamental cover.

9. A method for actuating an airbag assembly in a vehicle having an interior panel defining an exit opening for an airbag, comprising the steps of:

providing an airbag assembly comprising a housing having a first region and a second region, an airbag mounted in the first region, a gas generator mounted in the second region, a pair of airbag flaps each having a first portion and a second portion, said second portions of said airbag flaps together forming a tapered inward shape, said second portions being pivotally mounted on opposite sides of the airbag;

mounting in a vehicle having an interior panel defining an exit opening for an airbag, the airbag assembly behind the exit opening away from the vehicle interior so that the first region lies adjacent the exit opening and the second region lies remote from the exit opening, and said first portions of said airbag flaps lie adjacent to and extend across the exit opening;

inflating the airbag in response to a condition whereby during inflation the airbag will contact the second portions and pivot the second portions outwardly away from each other while moving the first portions away from each other and partially beneath the vehicle panel to free the exit opening and allow the inflating airbag passage into the vehicle interior.

10. A method for actuating an airbag assembly according to claim 9 wherein an ornamental cover is provided that contains a weakened burst line, and the further step of bursting the cover during inflation of the airbag.

11. A method for actuating an airbag assembly according to claim 9 comprising the further step of stopping the outward pivoting of the second portions of the airbag flaps after a predetermined pivotal motion.

12. A method for actuating an airbag assembly according to claim 10 comprising the further step of attaching the ornamental cover to the first portions of the airbag flaps on opposite sides of the weakened line.

13. A method for actuating an airbag assembly according to claim 10 comprising the further step of attaching the edge of the ornamental cover to the underside of the panel adjacent the exit opening, and breaking the attachment during inflation of the airbag to allow the ornamental cover and attached first portions to slide under the panel.

14. A method for actuating an airbag assembly according to claim 13 comprising the further steps of detachable holding the edge of the ornamental cover on the underside of the panel surrounding the exit opening and detaching the edge of the ornamental in response to the inflation of the airbag.

* * * * *